United States Patent
Ustarbowski et al.

(10) Patent No.: US 7,441,776 B2
(45) Date of Patent: Oct. 28, 2008

(54) THREE-DIMENSIONAL PUZZLE

(75) Inventors: Krzysztof Ustarbowski, Gdynia (PL);
Aleksandra Emmanouilidou, Gdynia (PL); Grzegorz Traczykowski, Gdynia (PL); Roman Kornela, Gdynia (PL);
Gordy Cockburn, Champaign, IL (US);
Krzysztof Furmanczyk, Gdynia (PL)

(73) Assignee: Hobbico, Inc., Champaign, IL (US)

( * ) Notice: Subject to any disclaimer, the term of this patent is extended or adjusted under 35 U.S.C. 154(b) by 0 days.

(21) Appl. No.: 10/993,120

(22) Filed: Nov. 19, 2004

(65) Prior Publication Data

US 2006/0108734 A1    May 25, 2006

(51) Int. Cl.
*A63F 9/08* (2006.01)
(52) U.S. Cl. .............................. 273/157 R; 273/153 R
(58) Field of Classification Search ............. 273/153 R, 273/153 S, 157 R
See application file for complete search history.

(56) References Cited

U.S. PATENT DOCUMENTS

| | | | | |
|---|---|---|---|---|
| 3,264,164 A | * | 8/1966 | Jerothe et al. | 428/29 |
| 3,692,312 A | * | 9/1972 | Meyer | 273/157 R |
| 5,672,412 A | * | 9/1997 | Phares et al. | 108/51.3 |
| 5,896,230 A | | 4/1999 | Goggins | |
| 6,547,243 B2 | | 4/2003 | Juenger | |
| 6,739,270 B1 | * | 5/2004 | Sewell | 108/51.3 |
| 6,900,944 B2 | * | 5/2005 | Tomczyk | 359/619 |

* cited by examiner

*Primary Examiner*—Steven Wong
(74) *Attorney, Agent, or Firm*—Drinker Biddle & Reath LLP

(57) ABSTRACT

A three-dimensional puzzle including a lenticular lens layer having a lens surface and a flat surface. A four color ink is applied to the flat surface and a layer of opaque ink is applied to the four color ink. A white paper backing is adhered to the layer of opaque ink using an emulsion based adhesive having a viscosity of approximately 1,600 mPas at 23° C., and a backer board comprised of four layers of cardboard is applied to the white paper backing. A method of manufacturing the three-dimensional puzzle is also disclosed.

8 Claims, 1 Drawing Sheet

THREE-DIMENSIONAL PUZZLE

FIELD OF THE INVENTION

This invention pertains to puzzles in general and, more particularly, to three-dimensional puzzles

BACKGROUND OF THE INVENTION

Puzzles have long been a source of entertainment and enjoyment for individuals both young and old. For the youngest child, puzzles which usually involve a few large pieces, serve not only as entertainment, but also help to develop coordination along with color and shape recognition. As children get older, puzzles with many smaller pieces become popular as they offer more of a challenge to build than puzzles with large pieces.

Because the pieces of a puzzle can only be cut so small in order for the puzzle to be practical to construct, puzzle manufacturers must continue to come up with new ways to make the puzzle challenging. This is done, for example, by making the puzzle from a multi-colored picture or using scenes where colors blend in with one another such as the reds, yellows and orange of a sunset or the various shades of blue and green involved with a seascape. A three-dimensional puzzle gives the added dimension of depth to the scene, thereby making it more difficult to construct.

Three-dimensional puzzles are known in the art. For example, U.S. Pat. No. 6,547,243 (Juenger) discloses a portable three-dimensional puzzle having a magnetic backing that makes it easier to use when traveling. Furthermore, U.S. Pat. No. 5,896,230 discloses a method for producing a multidimensional image using a lenticular lens.

Three-dimensional puzzles that can be cut into several small pieces, such as a 500 piece puzzle set, are not well known, however. This is because when cutting the photographic sheet into a puzzle, the greater the amount of rule in a square inch, the greater the amount of tension or pressure in the sheet. In other words, the larger the pieces of the puzzle, the less pressure involved in cutting them.

The greater pressure involved in cutting a puzzle into numerous small pieces causes the backing board to weaken, thus causing the images on the puzzle pieces to delaminate. This decreases the sharpness of the image and results in cloudy condition on the edges of the puzzle piece. For this reason, a three-dimensional puzzle that is capable of being cut into numerous small pieces without causing deterioration of the image of the puzzle would be an important improvement in the art.

BRIEF SUMMARY OF THE INVENTION

The invention is directed to a puzzle comprised of a lenticular lens layer having a lens surface and a flat surface. A layer of four colors of ink is applied to the flat surface and a layer of opaque ink is applied to the four colors of ink. A white paper backing is adhered to the layer of opaque ink using an emulsion based adhesive having a viscosity of approximately 1,600 mPas at 23° C., and a backer board comprised of four layers of cardboard is applied to the white paper backing.

The invention also involves a method of manufacturing a three-dimensional puzzle. The method is comprised of the steps of: (a) providing a lenticular lens layer having a lens surface and a flat surface; (b) applying a layer of four colors of ink to the flat surface of the lenticular lens layer; (c) providing a first exposure of ultraviolet light to the layer of four colors of ink; (d) adding a layer of opaque ink to the layer of four colors of ink; (e) providing a second exposure of ultraviolet light to all layers of the puzzle; (f) providing a third exposure of ultraviolet light to all layers of the puzzle; (g) providing a fourth exposure of ultraviolet light to all layers of the puzzle; (h) providing a fifth exposure of ultraviolet light to all layers of the puzzle; (i) adhering a layer of white paper backing on top of the layer of opaque ink; and (j) attaching a backer board on top of the layer of white paper backing.

A method for cutting the puzzle is also disclosed. This involves the steps of (a) providing a cutting platform; (b) cutting at least one groove in the platform, the groove forming the shape of at least one puzzle piece; (c) positioning a cutting instrument in the at least one groove; (d) placing a piece of rubber over the cutting instrument; (e) inserting at least one insert in at least one location between the rubber and the cutting platform; and (f) pressing the three-dimensional puzzle over the cutting instrument, thereby cutting the three-dimensional puzzle into at lest one puzzle piece.

DETAILED DESCRIPTION OF THE INVENTION

Figure 1:
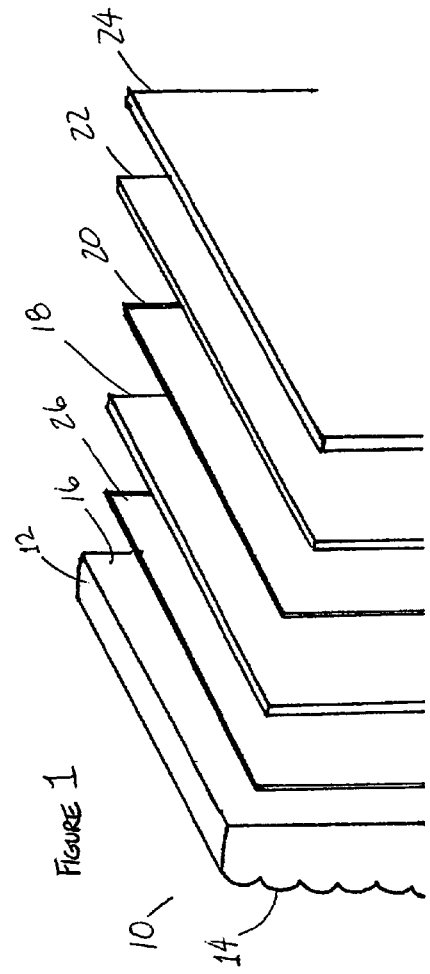
FIG. 1 is a schematic showing the layers of the three-dimensional puzzle.
Figure 2:
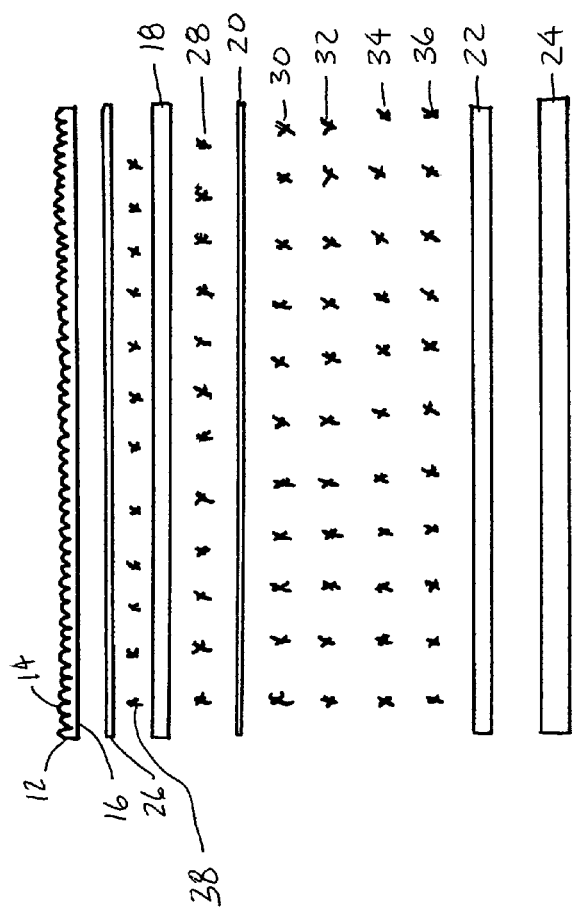
FIG. 2 is a schematic view of the steps of the puzzle manufacturing method.
Figure 3:
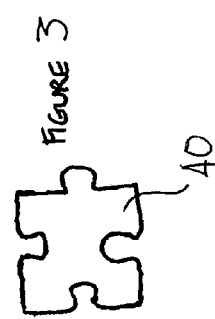
FIG. 3 is a top view of a puzzle piece.

The following examples further illustrate the invention but, of course, should not be construed as in any way limiting its scope. As shown in FIGS. 1-3, the invention involves a puzzle 10 comprised of a lenticular lens layer 12 having a lens surface 14 and a flat surface 16. A layer of four colors of ink 18 is applied to the flat surface 16, and a layer of opaque ink 20 applied to the four colors of ink 18. A white paper backing 22 is adhered to the layer of opaque ink 20 using an emulsion-based adhesive having a viscosity of approximately 1,600 mPas at 23° C., and a backer board 24 comprised of four layers of cardboard is applied to the white paper backing 22.

In one embodiment, the puzzle 10 is further comprised of a layer of primer 26 located between the flat surface 16 of the lenticular lens layer 12 and the layer of four colors of ink 18. The primer is a UV/EB Curable adhesive, primer, coating that is sold under various trade names including Rad-Cure, Rad-Kote and Rad-Prime.

The lenticular lens layer 12 used with the puzzle 10 has a thickness in the range of approximately at least 10 to approximately at least 15 mil, and more preferably approximately 14 mil. Furthermore, the grain of each of the layers of the four layer backer board 24 is perpendicular to the grain of its adjoining layers, and the four layer backer board 24 has a thickness of approximately 1.25 mm.

The layer of four colors of ink 18 used with the puzzle 10 can be an ultraviolet lamination formulation or a hybrid ultraviolet formulation. The opaque ink may be white.

As shown in FIG. 3, the invention also involves a method for manufacturing a three-dimensional puzzle 10, the method comprising the steps of: (a) providing a lenticular lens layer 12 having a lens surface 14 and a flat surface 16; (b) priming the flat surface 16 of the lenticular lens layer 12; (c) exposing the primed flat surface 16 of the lenticular lens layer 12 to ultraviolet light; (d) applying a layer of four colors of ink 18 to the flat surface 16 of the lenticular lens layer 12; (e) providing a first exposure 28 of ultraviolet light to the layer of four colors of ink 18; (f) adding a layer of opaque ink 20 to the layer of four colors of ink 18; (g) providing a second exposure 30 of ultraviolet light to all layers of the puzzle 10; (h) providing a third exposure 32 of ultraviolet light to all layers of the puzzle 10; (i) providing a fourth exposure 34 of ultraviolet light to all layers of the puzzle 10; providing a fifth exposure 36 of ultraviolet light to all layers of the puzzle 10; (k) adhering a layer of white paper backing 22 on top of the layer of opaque ink 20; and (l) attaching a backer board 24 on top of the layer of white paper backing 22.

In the inventive method, once the primer is applied, the primed flat surface 16 of the lenticular lens 12 is cured using exposure to ultraviolet light of approximately 840 watts for less than one second.

The four colors of ink used with the invention are comprised of black, cyan, magenta and yellow inks. In one embodiment, the black ink is first applied to the lenticular lens 12, the cyan ink is applied second, the magenta ink is applied third, and the yellow ink is applied fourth. These four colors of ink may be printed using stochastic screen printing methods; however, conventional screening methods may also be used without departing from the scope and spirit of the invention.

When performing the inventive method, after the layer of the four colors of ink 18 is applied, the puzzle is exposed to approximately 1,120 watts of ultraviolet light for less than one second. Following this exposure, a layer of opaque ink 20, which may be white, is added. The layers of the puzzle are then given another exposure to ultraviolet light, this time the exposure being approximately 1,330 watts of ultraviolet light for less than one second. Once this exposure is complete, the layers of the puzzle are exposed to approximately 840 watts of ultraviolet light for less than one second. This exposure is followed by a still another exposure of ultraviolet light to the layers of the puzzle 10. This latest exposure being approximately 1,120 watts of light for less than one second. Finally, the layers of the puzzle 10 are exposed to ultraviolet light for a final time, this final time being approximately 1,190 watts of light for less than one second.

In constructing the puzzle 110, the layer of white paper backing 22 is applied to the layer of opaque ink 20 using a polyacid adhesive. The backer board layer 24 is then applied to the white paper backing layer 22 using a conventional glue or adhesive.

The lenticular lens 12 used in constructing the puzzle 10 has a thickness in the range of approximately 10 to approximately 15 mil, and more preferably approximately 14 mil. This is because a lenticular lens having a thickness less than approximately 10 mil tends to alter the visual appearance of the puzzle by distorting the perception of depth. On the other hand, although a thickness greater than 15 mil produces a greater perception of depth to the viewer, it is more difficult to cut without causing the images on the puzzle pieces to delaminate, thereby decreasing the sharpness of the image.

Although puzzles having a lenticular lens with a thickness of approximately 18 mil are known, these puzzles are a 2-image flip lenticular, not three-dimensional puzzles. A 2-image flip lenticular is a puzzle that allows one to see two different images depending on how the puzzle is tilted. Because of the thickness of the lens, it is difficult to cut the puzzle into anything smaller than a few large pieces that are common in children's puzzle. In fact, puzzles utilizing a lenticular lens that is 18 mil thick have been discontinued in that it is cost prohibitive to cut a puzzle having a lens of this thickness into smaller pieces such as those used in 250 or 500 piece puzzles.

The backer board 24 used in the inventive puzzle is comprised of four layers of cardboard. This four-layer backer board 24 has a thickness of approximately 1.25 mm and the grain of each of the four layers of cardboard is oriented perpendicular to the grain of each of the adjacent layers.

The method of manufacturing the puzzle 10 may also involve the steps of (a) providing a cutting platform; (b) cutting at least one groove in the platform, the groove forming the shape of at least one puzzle piece; (c) positioning a cutting instrument in the at least one groove; (d) placing a piece of rubber over the cutting instrument; (e) inserting at least one insert in at least one location between the rubber and the cutting platform; and (f) pressing the three-dimensional puzzle over the cutting instrument, thereby cutting the three-dimensional puzzle into at least one puzzle piece 40, as shown in FIG. 3.

In one embodiment of the inventive method, the at least one groove is part of a plurality of grooves. This plurality of grooves form the shapes of a plurality of puzzle pieces, and the pressing of the three-dimensional puzzle over the cutting instrument, cuts the three-dimensional puzzle into a plurality of puzzle pieces. Once the puzzle has been cut into a plurality of pieces, the plurality of puzzle pieces are then separated from one another. This is done when the puzzle is "crushed" for packaging. When the puzzle is crushed for packaging, special rubber tips are affixed to the "teeth" in the delivery portion of the packaging machine. These rubber tips provide the additional force needed to separate the pieces without marring the image on the puzzle.

The cutting instrument used to cut the puzzle may be a double-sharpened, hardened steel rule or knife that uses harder steel than is normally associated with puzzle die-cutting. This knife has a body and a blade with the hardness of the body being at least approximately 39 HRC, and the hardness of the blade being at least approximately 57 HRC.

The rubber used in the cutting process may be ejection rubber having a thickness of approximately 7 mm and a hardness of approximately 45 shore. This is a more rigid material than is normally used in puzzle cutting. Additionally, a plurality of inserts may be positioned in a plurality of locations between the rubber and the cutting platform. This plurality of inserts may vary the height of the ejection rubber from approximately 0.001 mm to approximately 0.01 mm at certain locations in the die. This altering of the height of the ejection rubber allows for a clean cut across the entire surface of the puzzle.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A puzzle comprised of:
   a lenticular lens layer having a lens surface and a flat surface;
   a layer of four colors of ink applied to the flat surface;
   a layer of opaque ink applied to the layer of four colors of ink;
   a white paper backing adhered to the layer of opaque ink with an emulsion based adhesive having a viscosity of approximately 1,600 mPas at 23° C.; and
   a backer board having a thickness of approximately 1.25 mm, said backer board comprised of four layers of cardboard applied to the white paper backing, the grain of each of the four layers being perpendicular to the grain of each layer adjacent to it.

2. The puzzle of claim 1 further comprising a layer of primer between the flat surface of the lenticular lens layer and the four colors of ink layer.

3. The puzzle of claim 1, wherein the lenticular lens layer has a thickness of at least approximately 10 mil.

4. The puzzle of claim 1, wherein the lenticular lens layer has a thickness in the range of approximately 10 mil to approximately 15 mil.

5. The puzzle of claim 4, wherein the lenticular lens layer has a thickness of approximately 14 mil.

6. The puzzle of claim 1, wherein the four color ink is an ultraviolet lamination formulation.

7. The puzzle of claim 1, wherein the four color ink is a hybrid ultraviolet formulation.

8. The puzzle of claim 1, wherein the opaque ink is white.

* * * * *